United States Patent
Oohara et al.

(10) Patent No.: US 7,667,343 B2
(45) Date of Patent: Feb. 23, 2010

(54) HYDROGEN PRODUCTION SYSTEM USING WIND TURBINE GENERATOR

(75) Inventors: Shinya Oohara, Hitachi (JP); Masaya Ichinose, Hitachiota (JP); Motoo Futami, Hitachiota (JP); Mitsugu Matsutake, Hitachi (JP); Kazumi Fujii, Hitachi (JP); Kazumasa Ide, Hitachiota (JP); Takeyuki Itabashi, Hitachi (JP); Junji Tamura, Kitami (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/654,684

(22) Filed: Jan. 18, 2007

(65) Prior Publication Data
US 2007/0216165 A1 Sep. 20, 2007

(30) Foreign Application Priority Data
Mar. 14, 2006 (JP) .............................. 2006-068915

(51) Int. Cl.
  F03D 9/00 (2006.01)
  H02P 9/00 (2006.01)
(52) U.S. Cl. ...................................................... 290/44
(58) Field of Classification Search .................... 290/44
See application file for complete search history.

(56) References Cited

U.S. PATENT DOCUMENTS

| | | | | |
|---|---|---|---|---|
| 4,059,771 A * | 11/1977 | Jacobs et al. | ................... | 290/44 |
| 4,228,361 A * | 10/1980 | Jacobs et al. | ................... | 290/44 |
| 4,535,252 A * | 8/1985 | Jacobs et al. | ................... | 290/44 |
| 5,592,028 A * | 1/1997 | Pritchard | ...................... | 290/55 |
| 6,211,643 B1 * | 4/2001 | Kagatani | .................... | 320/101 |
| 6,303,009 B1 * | 10/2001 | Bossard | ................... | 204/228.4 |
| 6,901,302 B2 * | 5/2005 | Kami | ......................... | 700/90 |
| 6,924,991 B2 * | 8/2005 | Skeist et al. | ............. | 363/21.02 |
| 7,048,839 B2 * | 5/2006 | Harada | ........................ | 204/266 |
| 7,199,482 B2 * | 4/2007 | Hopewell | ..................... | 290/44 |
| 7,233,079 B1 * | 6/2007 | Cooper | ........................ | 290/44 |
| 7,393,440 B2 * | 7/2008 | Ghosh et al. | ............. | 204/275.1 |
| 2003/0129117 A1 * | 7/2003 | Mills | ........................... | 423/347 |
| 2006/0222912 A1 * | 10/2006 | Smith | .......................... | 429/21 |
| 2007/0013194 A1 * | 1/2007 | Calley | ........................ | 290/44 |

(Continued)

FOREIGN PATENT DOCUMENTS

JP          11228101 A   *   8/1999

(Continued)

Primary Examiner—Joseph Waks
(74) Attorney, Agent, or Firm—Antonelli, Terry, Stout & Kraus, LLP.

(57) ABSTRACT

A wind turbine-driven hydrogen production system controlling a power converter system such that the wind turbine stays in its operable range for a longer time and thus the hydrogen production system produces hydrogen for a longer time. The wind turbine-driven hydrogen production system varies an amount of electrical current supplied to an electrolytic hydrogen production system according to the rotational speed of the wind turbine to reduce variations in the rotational speed. Furthermore, the pitch angle of the wind turbine varies according to the speed. Thus, variations in the speed of the wind turbine can be reduced. A permanent-magnet generator is used as the electricity generator of the wind turbine to obtain a power supply at start-up. Alternatively, a power storage system used as assistive equipment at start-up is supplementarily added or only a power supply for the controllers is supplied from a system.

6 Claims, 13 Drawing Sheets

U.S. PATENT DOCUMENTS

| | | | |
|---|---|---|---|
| 2007/0079611 A1* | 4/2007 | Doland | 60/495 |
| 2007/0290506 A1* | 12/2007 | Walling | 290/44 |
| 2008/0121525 A1* | 5/2008 | Doland | 204/661 |

FOREIGN PATENT DOCUMENTS

| | | |
|---|---|---|
| JP | 2004-269945 | 9/2004 |
| JP | 2005-027361 | 1/2005 |
| JP | 2005-073418 | 3/2005 |
| JP | 2005073418 A * | 3/2005 |

* cited by examiner

HYDROGEN PRODUCTION SYSTEM USING WIND TURBINE GENERATOR

CROSS REFERENCE TO RELATED APPLICATION

The present application claims priority from Japanese application JP2006-068915 filed on Mar. 14, 2006, the content of which is incorporated by reference herein.

BACKGROUND OF THE INVENTION

The present invention relates to a wind turbine-driven hydrogen production system for producing hydrogen by supplying electric power generated by a wind turbine to an electrolytic hydrogen production system and, more particularly, to a wind turbine-driven hydrogen production system which includes the wind turbine whose main circuit portions are mounted independent of a power system.

Today, most of energies sustaining our life are supplied from fossil fuels. However, there is the problem that the resources will be exhausted. In addition, there is the problem of environmental crises such as global warming. One conceivable method of solving these problems is to exploit a renewable energy such as wind power, solar energy, or water power.

Renewable energies such as wind power generation have the disadvantages that the power densities are low and supply of energy is unstable. One method of solving these problems consists of once converting energy into hydrogen, i.e., a secondary energy, storing it, and supplying the hydrogen in response to energy demand, thus achieving stable supply of energy. Hydrogen energy also has the advantage that it can be stored more easily than electrical energy. A hydrogen production system which produces hydrogen by generating electric power with a wind turbine and supplying the generated electric power to an electrolytic hydrogen production system has been created from these viewpoints.

Generally, sites where wind turbines are installed must satisfy the requirements: (1) the sites are in good wind conditions; and (2) land sites where wind turbines can be installed are secured. Remote rural areas, isolated islands, and offshore sites may be highly potential candidates for such sites. However, at such sites, a power system for connecting the wind turbines may not be present, in which case the generated electric power cannot be transmitted. Furthermore, if a power system exists, such sites are remote from the main power system. Therefore, the system equipment does not often have a capacity to transmit electric power generated by wind turbines. This point hinders introduction of wind turbines. If a hydrogen production system which produces hydrogen with electric power generated by wind turbines and stores the hydrogen is available, any power system for transmitting electricity is not required and so it is possible to make efficient use of the wind turbines.

One method for use with a hydrogen production system utilizing wind turbines is proposed to especially enhance the efficiency of production of hydrogen. When the wind speed is less than the nominal (rated) wind speed for the wind turbines, the hydrogen production system is controlled with a constant voltage, and the load is divided. When the wind speed is higher than the nominal (rated) wind speed, the system is controlled with a constant current. The contents of this technique are described in JP2005-27361, paragraph 0004.

JP2004-269945, especially from paragraph 0008 to paragraph 0011, states a method for enhancing the efficiency of production of hydrogen of a hydrogen production system utilizing wind turbines. The wind turbines are controlled at a rotational speed at which the efficiency of power generation of the wind turbines is maximized within a range of wind speeds. The hydrogen production system is controlled with a constant voltage.

A method of controlling a voltage for maximizing the efficiency of power generation of wind turbines in a hydrogen production system utilizing these turbines is described in JP2005-073418, paragraph 0008.

Where wind turbines are installed independent of a power system and electric power generated by the turbines is supplied to an electrolytic hydrogen production system to produce hydrogen, any power system acting to absorb variations in the output from the wind turbines does not exist. Therefore, the rotational speed of the wind turbines vary greatly and goes beyond the operable range and thus the power generation stops. As a result, the operation time of the wind turbines is shortened, reducing the amount of produced hydrogen. Furthermore, where a hydrogen production system consisting of wind turbines and an electrolytic hydrogen production system is installed independent of a power system, the power supply for controlling the hydrogen production system cannot be used from the system at start-up of the turbines and, therefore, self-starting cannot be done.

SUMMARY OF THE INVENTION

It is an object of the present invention to provide a hydrogen production system which uses a wind turbine and which controls a power converter system in such a way that the wind turbine stays in its operable range for a longer time to thereby produce hydrogen for a longer time.

The amount of electrical current supplied to the electrolytic hydrogen production system is varied according to the rotational speed of the wind turbine, thus reducing variations in the rotational speed. Furthermore, the pitch angle of the wind turbine is varied according to the rotational speed. This reduces variations in the rotational speed of the wind turbine. A permanent-magnet generator is used as an electricity generator for the wind turbine to derive a power supply during start-up. Alternatively, a power storage system is used as an assisting device at start-up or only a power supply for control is supplied from the system.

In the wind turbine-driven hydrogen production system according to the present invention, the wind turbine stays in its operable range in a longer time. The wind turbine is stopped less frequently than conventional. Consequently, hydrogen is produced for a longer time. This increases the amount of hydrogen produced by the hydrogen production system.

DETAILED DESCRIPTION OF THE INVENTION

In the present application, in order to effectively produce hydrogen by a hydrogen production system independently operable from a power supply system, such a hydrogen production system is accomplished through a current control based on a rotational rate of a generator, a pitch angle control and a self-driven of the production system.

Embodiment 1

Figure 1:
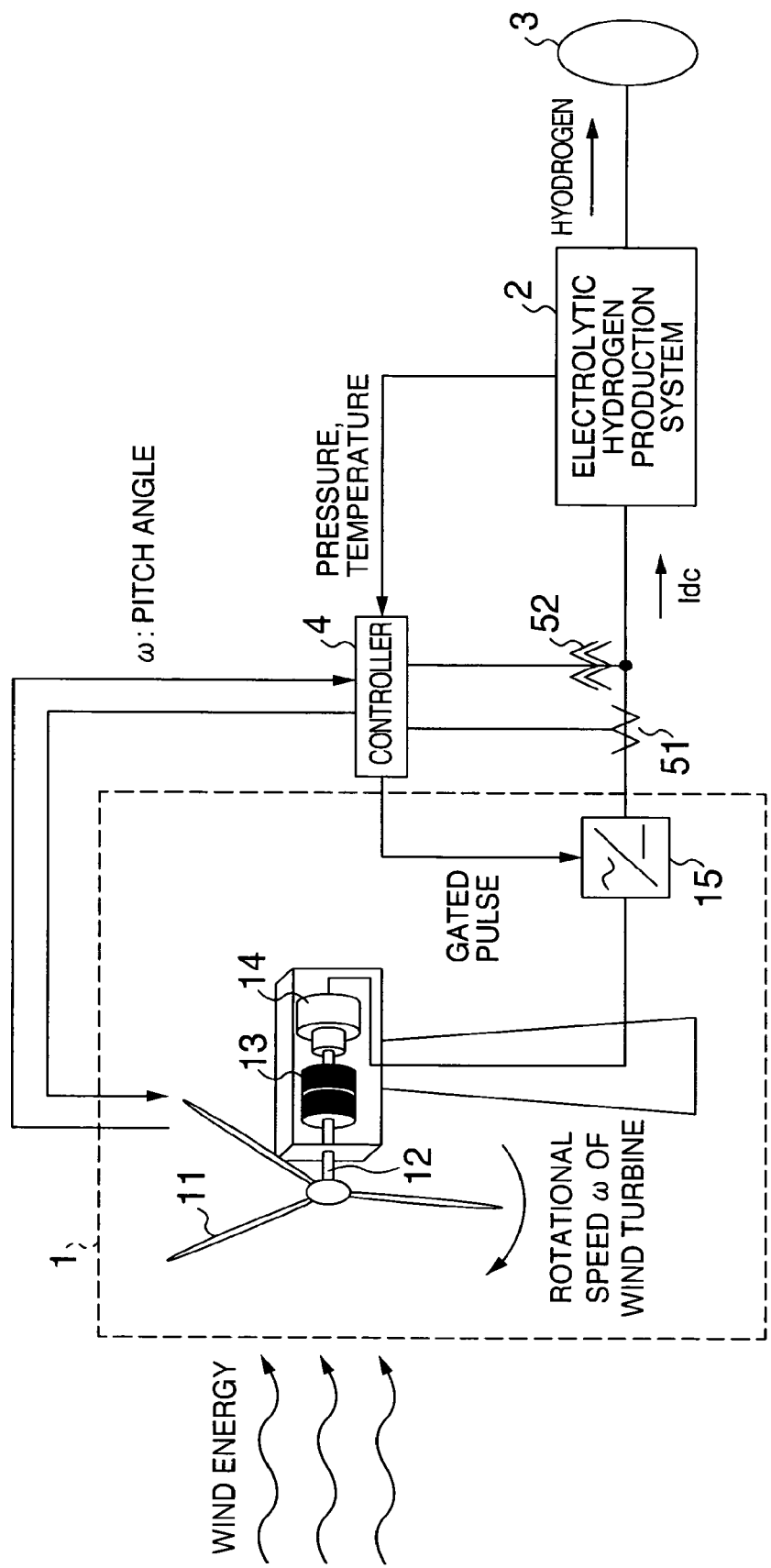
FIG. 1 is a diagram illustrating the configuration of a wind turbine-driven hydrogen production system according to Embodiment 1 of the invention.

FIG. 1 shows the configuration of a wind turbine-driven hydrogen production system according to an embodiment of the present invention. The wind turbine, indicated by reference numeral 1, has blades 11 catching wind, and acts to convert the wind energy into rotary energy. The blades 11 are connected to an electricity generator 14 via gears 13. The gears 13 convert the rotational speed of the blades 11 into a rotational speed adapted for the generator 14. A permanent-magnet generator, induction generator, synchronous generator, doubly-fed induction generator, or the like can be used as the generator 14. The rotary energy of the blades 11 is converted into electrical energy by the generator 14 and then transferred to a power converter system 15.

A controller 4 receives signals indicating the temperature of an electrolytic hydrogen production system 2, the pressure of the hydrogen, and the rotational speed ω of the wind turbine 1, and creates a command value Idc* of the electrical current supplied to the electrolytic hydrogen production system 2. A gated pulse command to be sent to the power converter system 15 is created from (i) the created current command value Idc*, (ii) the value Idc of the current detected by an ammeter 51 that is a DC current detector, and (iii) the value Vdc of the DC voltage applied to the hydrogen production system 2, and current control is provided. The value Vdc of the DC voltage is detected by a voltmeter 52 that is a DC voltage detector.

The amount of hydrogen produced by the electrolytic hydrogen production system 2 per a unit time is determined by the value of the electrical current supplied to this production system. The power converter system 15 controls the current value Idc supplied to the hydrogen production system 2, thus controlling the amount of produced hydrogen.

Figure 3:
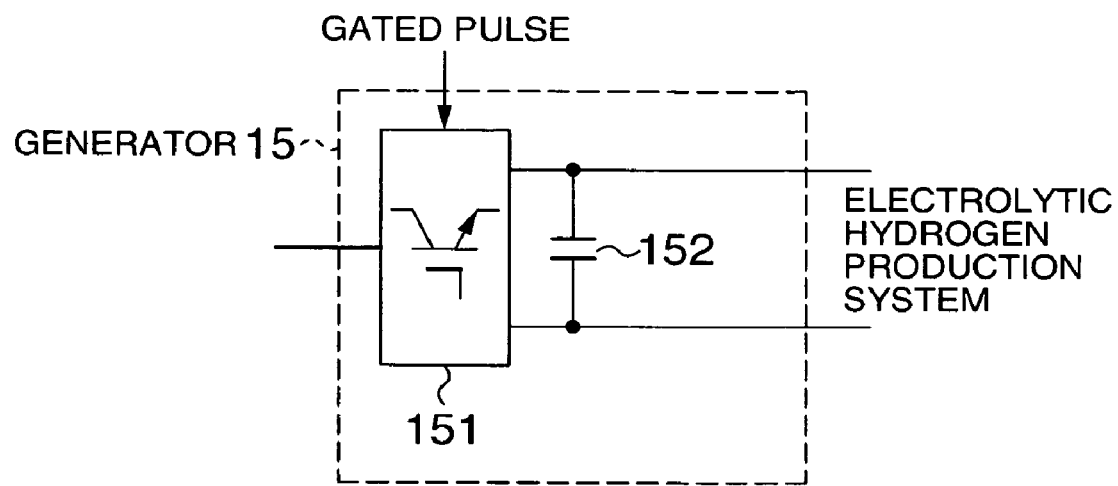
FIG. 3 is a diagram of a power converter system according to Embodiment 1.
Figure 4:
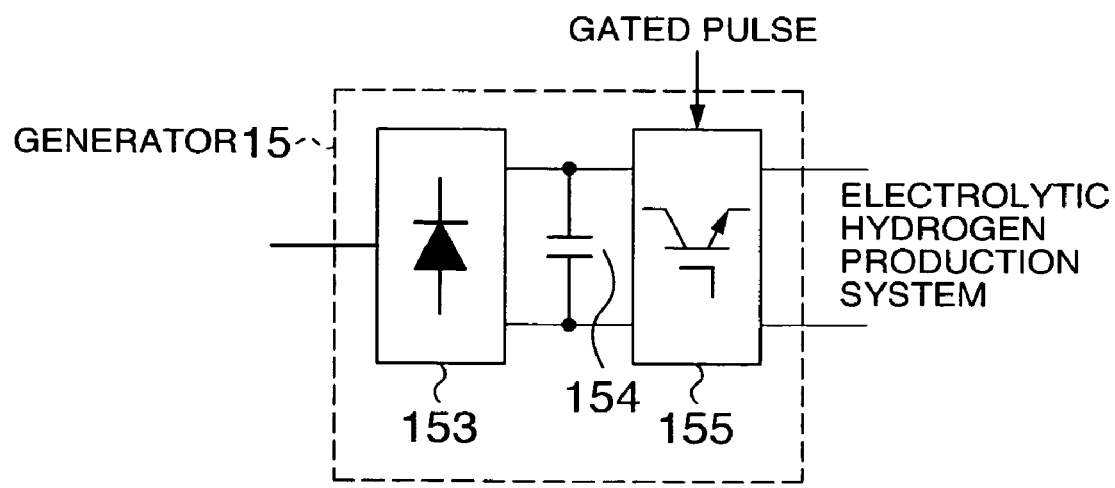
FIG. 4 is a diagram of another power converter system according to Embodiment 1.

The power converter system 15 is made up of a converter 151 and a DC-link capacitor 152 as shown in FIG. 3. The AC electrical energy from the generator side is converted into a DC current by the converter 151 and supplied to the electrolytic hydrogen production system 2. With respect to the configuration of the power converter system 15, rectification may be performed with a diode rectifier 153 as shown in FIG. 4. In this case, the DC capacitor 154 is electrically charged, and hydrogen is produced using the electric power from the DC capacitor. Therefore, the inverter 155 provides current control.

Figure 2:
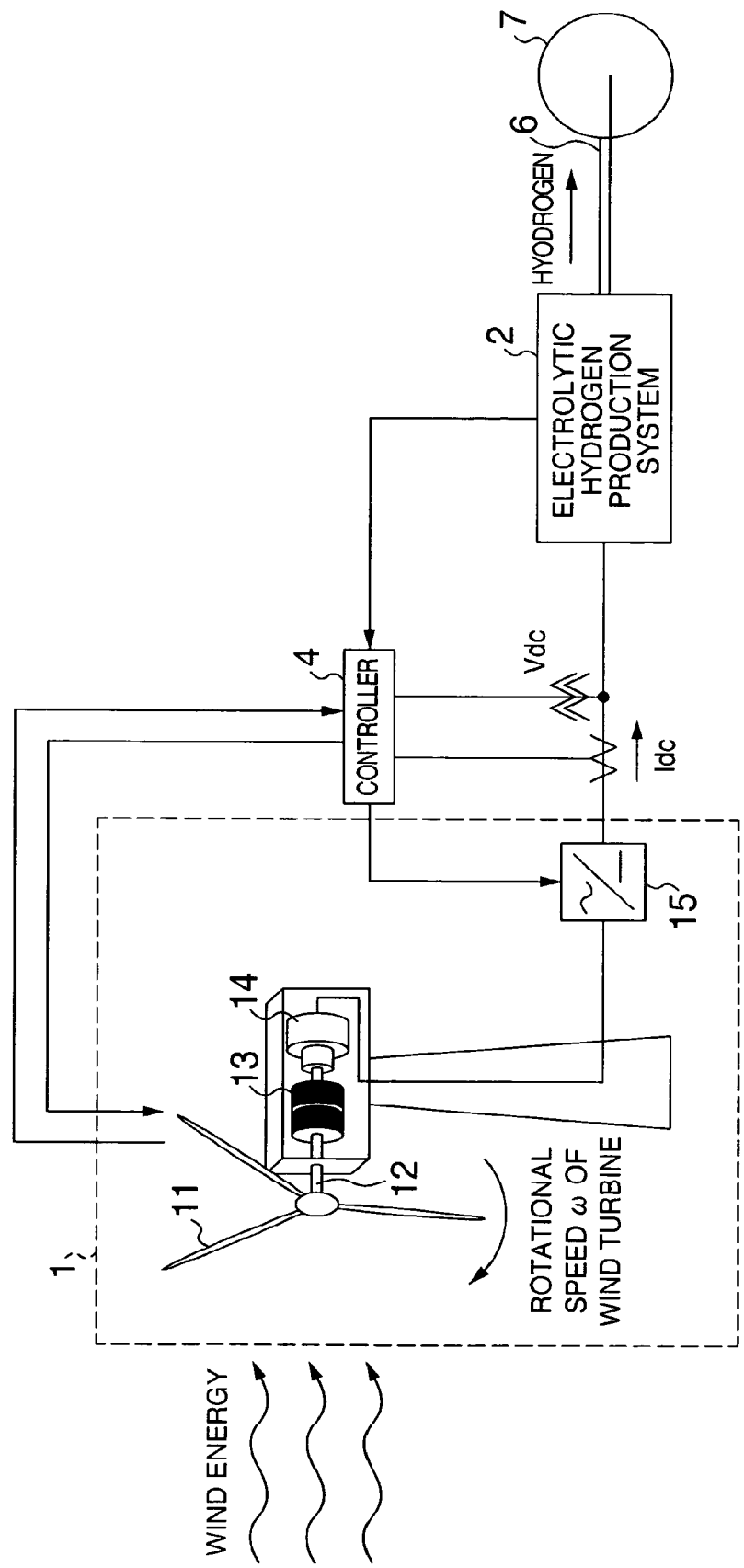
FIG. 2 is a diagram illustrating the configuration of another wind turbine-driven hydrogen production system according to Embodiment 1.

For example, a solid polymer electrolyte (SPE) water electrolytic hydrogen production system is used as the electrolytic hydrogen production system 2. Hydrogen produced by the hydrogen production system 2 is stored in a hydrogen storage device 3. The hydrogen stored in the hydrogen storage device 3 is charged into a hydrogen gas cylinder or the like and recovered regularly. The hydrogen produced in the electrolytic hydrogen production system 2 may be directly transported to a hydrogen consuming region 7 via a pipe line 6 as shown in FIG. 2.

Hydrogen is produced by the hydrogen production system of the configuration described so far. A method of controlling the hydrogen production system is next described.

Figure 5:
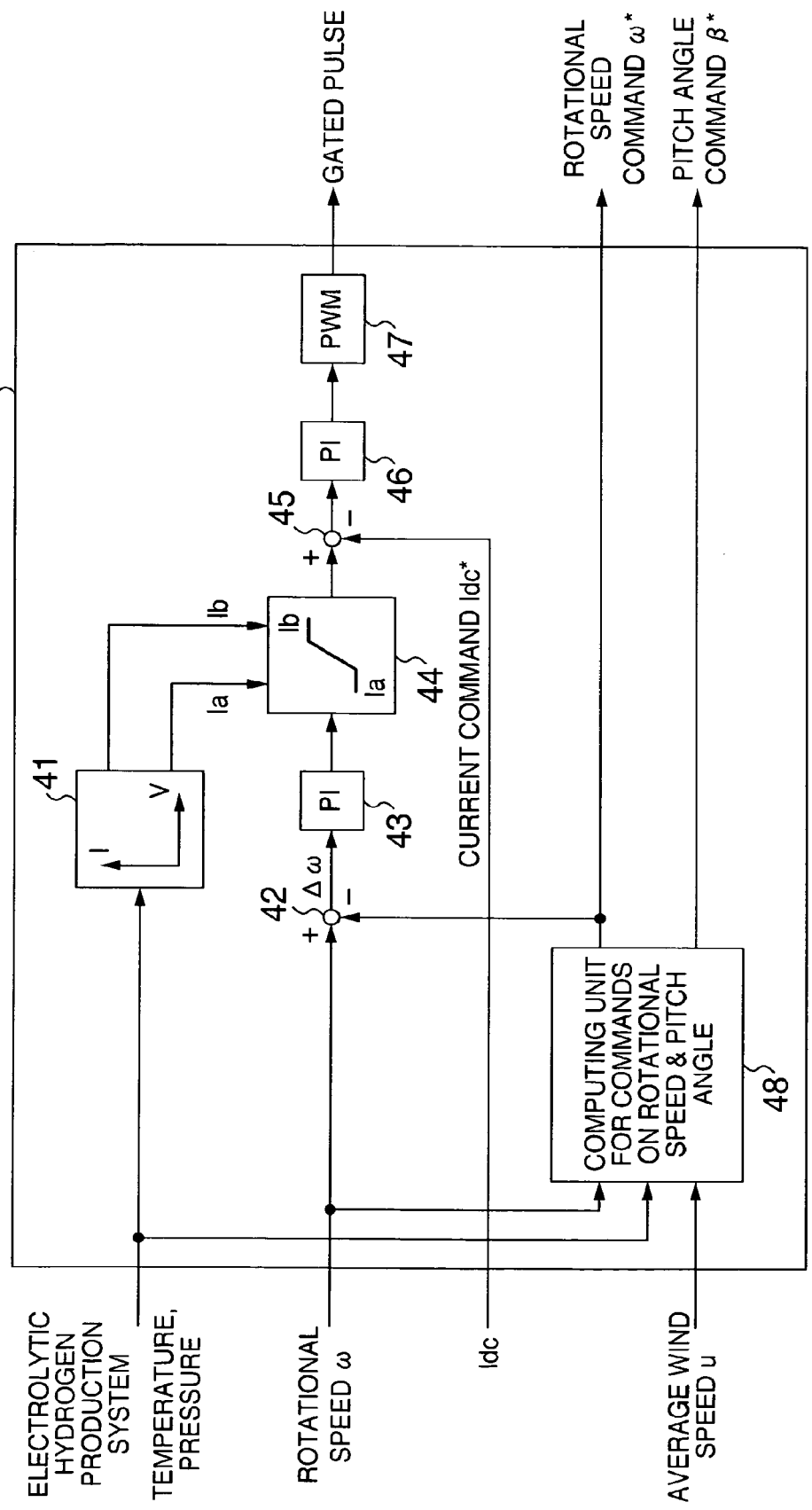
FIG. 5 is a block diagram of a controller according to Embodiment 1.

FIG. 5 shows the structure of the controller 4. This controller 4 has an internal computing unit 48 for computing a pitch angle command. The computing unit 48 creates the pitch angle command β* and a rotational speed command ω* from the average wind speed u, the rotational speed ω, and the temperature and pressure of the electrolytic hydrogen production system 2. Furthermore, the computing unit 48 creates a current command value Idc* from the obtained rotational speed command ω*. Gated pulses are created from the current command value Idc* and from the value Idc of the measured current, using a PWM controller. The method of control provided by the controller 4 is described in further detail in the following.

Figure 6:
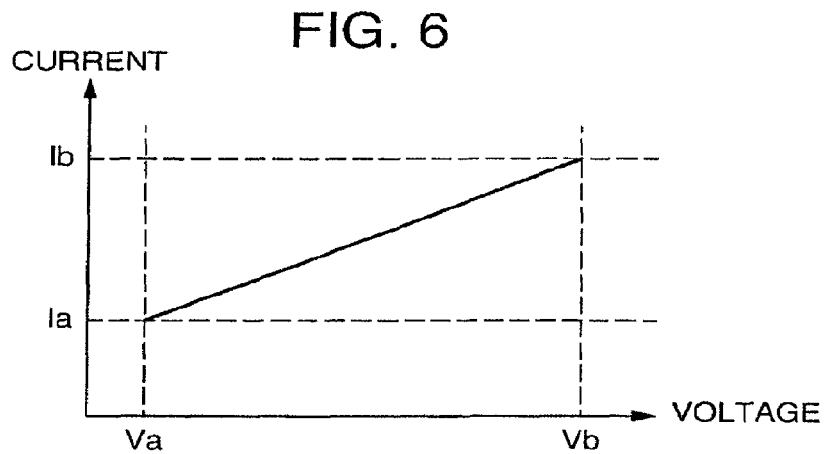
FIG. 6 is a graph showing the relation between voltage and current in an electrolytic hydrogen production system according to Embodiment 1.

A computing unit 41 for computing current limit values is described by referring to FIG. 6, which illustrates the relation between the voltage and current in the electrolytic hydrogen production system 2. When the voltage applied to the production system 2 exceeds Va, the amount of produced hydrogen begins to increase. At voltages in excess of Vb, the current value no longer increases and the amount of produced hydrogen does not increase if the voltage is increased. Further increase of the voltage will lead to deterioration of the hydrogen production system 2. Where hydrogen is produced, the value of the electrical current supplied to the hydrogen production system 2 must be over Ia and less than Ib.

The current-voltage characteristic curve shown in FIG. 6 varies depending on the temperature of the electrolytic hydrogen production system 2 and on the pressure of the hydrogen inside the production system 2. Therefore, the limit values Ia and Ib of the current also vary. The current limit value computing unit 41 determines the upper limit value Ib and the lower limit value Ia of the electrical current from the temperature of the hydrogen production system 2 and from the pressure of the hydrogen inside the production system 2. A limiter 44 receives the upper limit value Ib and the lower limit value Ia and limits the command value Idc* to values which are greater than Ia and less than Ib.

FIG. 5 illustrates a method of creating the current command Idc* in the controller 4. First, rotational speed command ω* and the actually measured value ω of rotational speed are passed through a subtractor 42 to create the variation component Δω of the rotational speed. This component Δω is passed through a proportional-integral controller 43 and the limiter 44 to create the current command Idc*. The limiter 44 limits the current command value Idc* to a range (more than Ia and less than Ib) in which hydrogen can be produced. With this method, variations of the generated electric power due to variations in the wind speed are partially absorbed by the amount of produced hydrogen. Variations in the rotational speed can be suppressed. Since current control provides quicker response than pitch angle control, variations in the electric power that cannot be suppressed by pitch angle control can be absorbed by the hydrogen production system 2.

The wind turbine 1 is a power generation system whose output power varies greatly depending on the wind speed. Where the wind turbine 1 is connected with a power system, the varying output power from the turbine can be directly supplied to the system. Therefore, the wind turbine 1 is so controlled that it can always generate electricity at its maximum efficiency. Consequently, the rotational speed of the blades of the wind turbine 1 is controlled to a value at which the turbine can generate electricity at the maximum efficiency at the average wind speed. However, in a system where the wind turbine 1 independent of the power system is connected with the electrolytic hydrogen production system 2 and hydrogen is produced, the varying output power is supplied only to the electrolytic hydrogen production system 2.

Figure 7:
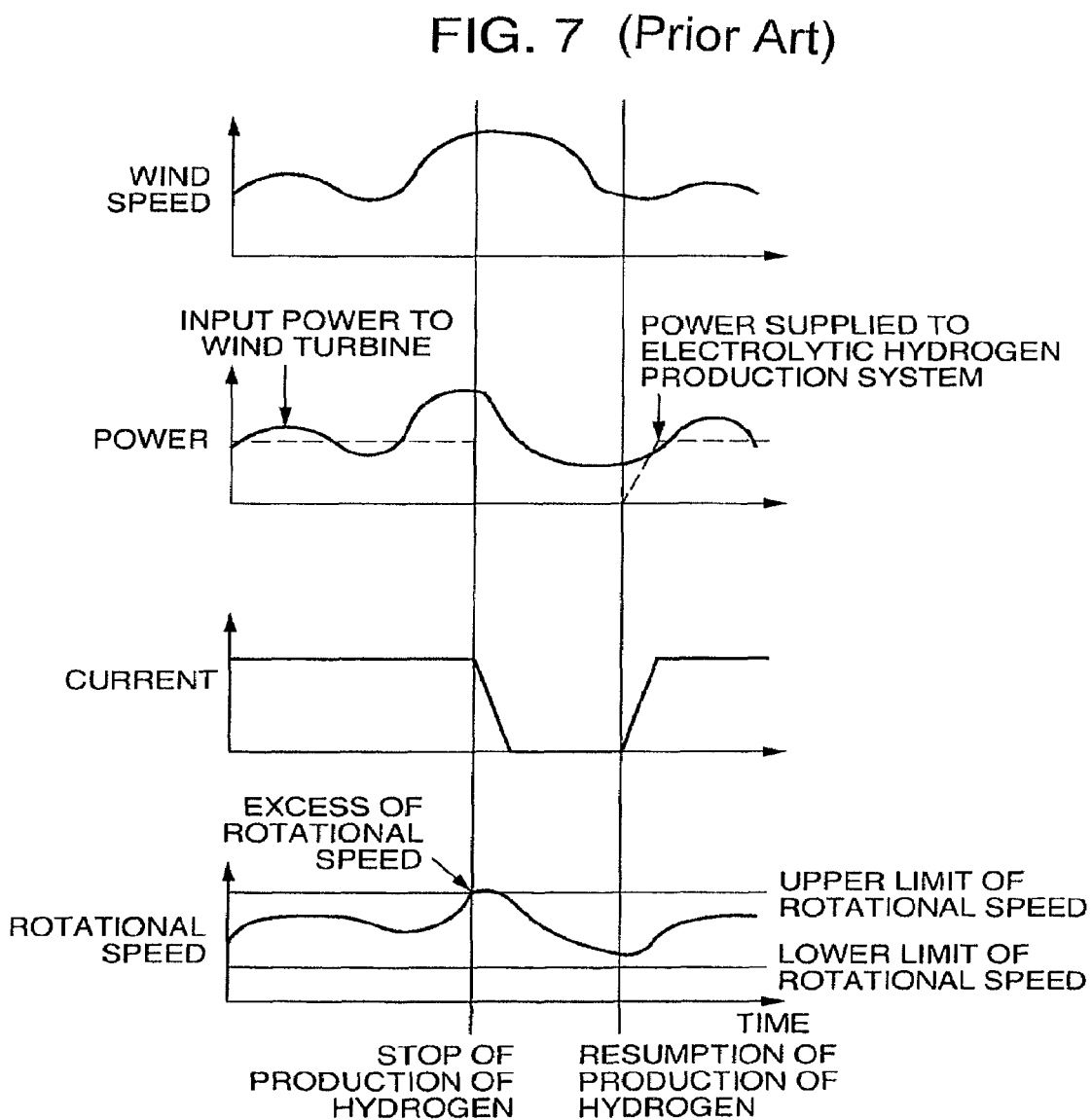
FIG. 7 shows graphs illustrating the operation of the prior-art hydrogen production system using a wind turbine.
Figure 8:
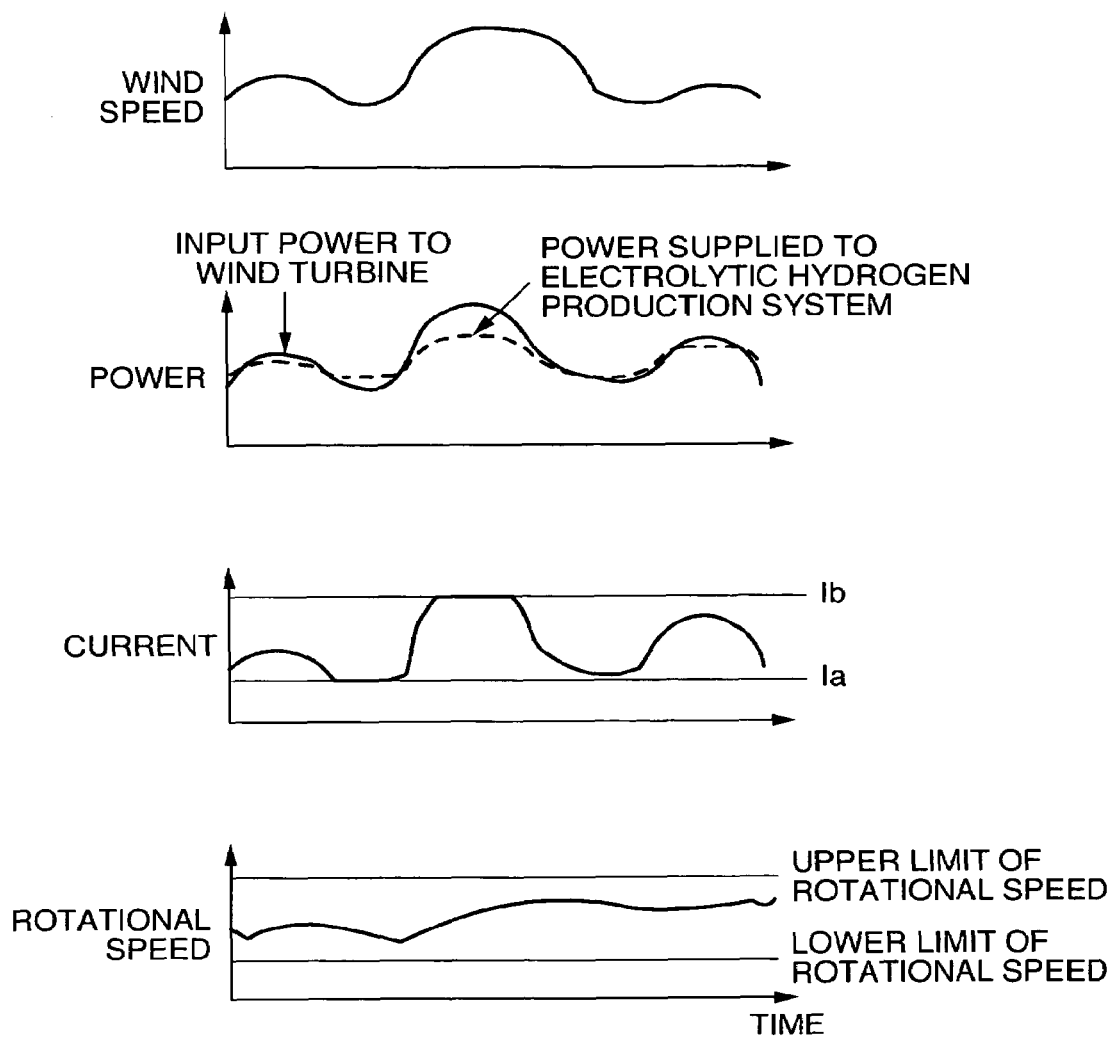
FIG. 8 shows graphs illustrating the operation of a wind turbine-driven hydrogen production system according to Embodiment 1.

It is assumed that the electrical current supplied to the electrolytic hydrogen production system 2 is kept constant in order to maintain constant the amount of hydrogen produced per unit time. The rotational speed of the wind turbine 1 is controlled only by controlling the pitch angle of the blades 11. Since the pitch angle control is a mechanical operation, the response cannot be made faster. The response of the control of the rotational speed cannot be made faster. The components of the variations in the turbine output power that cannot be suppressed by pitch angle control are absorbed as rotational energy of the blades 11 and as rotational energy of the electricity generator 14. Therefore, where the prior-art pitch angle control is used, if wind-induced quick variations that cannot be suppressed by pitch angle control are caused as shown in FIG. 7, the rotational speed of the blades varies greatly and may deviate from the operable range. If the rotational speed deviates from this range, the wind turbine 1 stops power generation. Therefore, electric power for producing hydrogen cannot be supplied. As a result, the time for which hydrogen is produced is shortened. This leads to a decrease in the amount of produced hydrogen. Where the control method of suppressing rotational speed variations utilizing current control shown in the present embodiment is used, the rotational speed of the wind turbine 1 varies to a lesser extent as shown in FIG. 8. The turbine can be run in such a way that its rotational speed does not deviate from the operable range.

Figure 9:
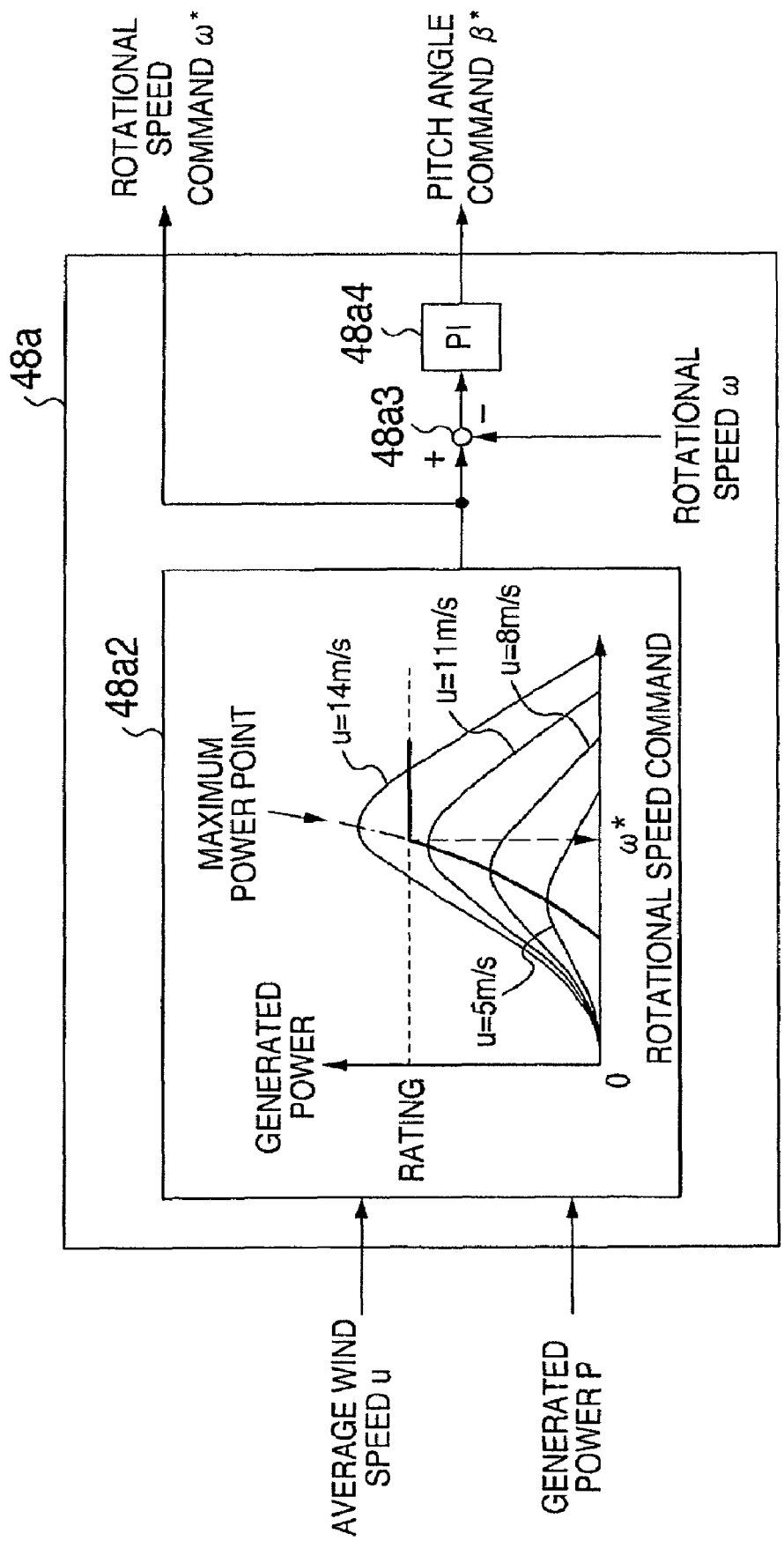
FIG. 9 is a block diagram illustrating the manner in which a pitch angle command is created by the prior-art technique.

A method of controlling the pitch angle is next described. First, the prior-art method of controlling the pitch angle is described by referring to FIG. 9. Assuming that the average wind speed at some instant of time is u (m/sec), the characteristics of the generated electric power relative to the rotational speed have a maximum value as shown on a rotational speed command computing unit 48a2. The wind turbine 1 time-averages measured instantaneous wind velocities and obtains an average wind speed u (m/sec). When the average wind speed is small, the turbine is preferably run at a rotational speed at which the output power is maximized to enhance the efficiency of the power generation. When the wind speed increases to some extent, the maximum electric power that can be generated exceeds the rating of the wind turbine 1. Accordingly, when the wind speed reaches a certain large value, a rotational speed at which the output power from the wind turbine 1 is kept constant is selected. When the average wind speed u is found in this way, the rotational speed command computing unit 48a2 obtains an optimum wind turbine rotational speed ω*. The rotational speed ω* is found by referring to a table or computationally found using a mathematical formula or using maximum power tracking. The actual rotational speed ω is subtracted from the obtained rotational speed command value ω* by a subtrator 48a3, thus creating the difference with the command value. This difference value is passed through a proportional integrator 48a4. In this way, a pitch angle command β* is created.

As described so far, in the prior-art method of control, if the wind speed is large, the rotational speed command value ω* delivered from the rotational speed command computing unit 48a2 is found from the maximum rating that can be generated by the generator 14. However, in the case of a hydrogen production system independent of the power system, the generated electric power must be totally consumed by the electrolytic hydrogen production system 2, because where the generated electric power is greater than the electric power consumed by production of hydrogen, extra electric power is preserved as rotational energy of the blades. Therefore, where the wind speed varies at high speeds and the operation of the pitch angle cannot catch up with it, the rotational speed of the blades exceeds the operable range. Consequently, the wind turbine comes to a stop.

Figure 10:
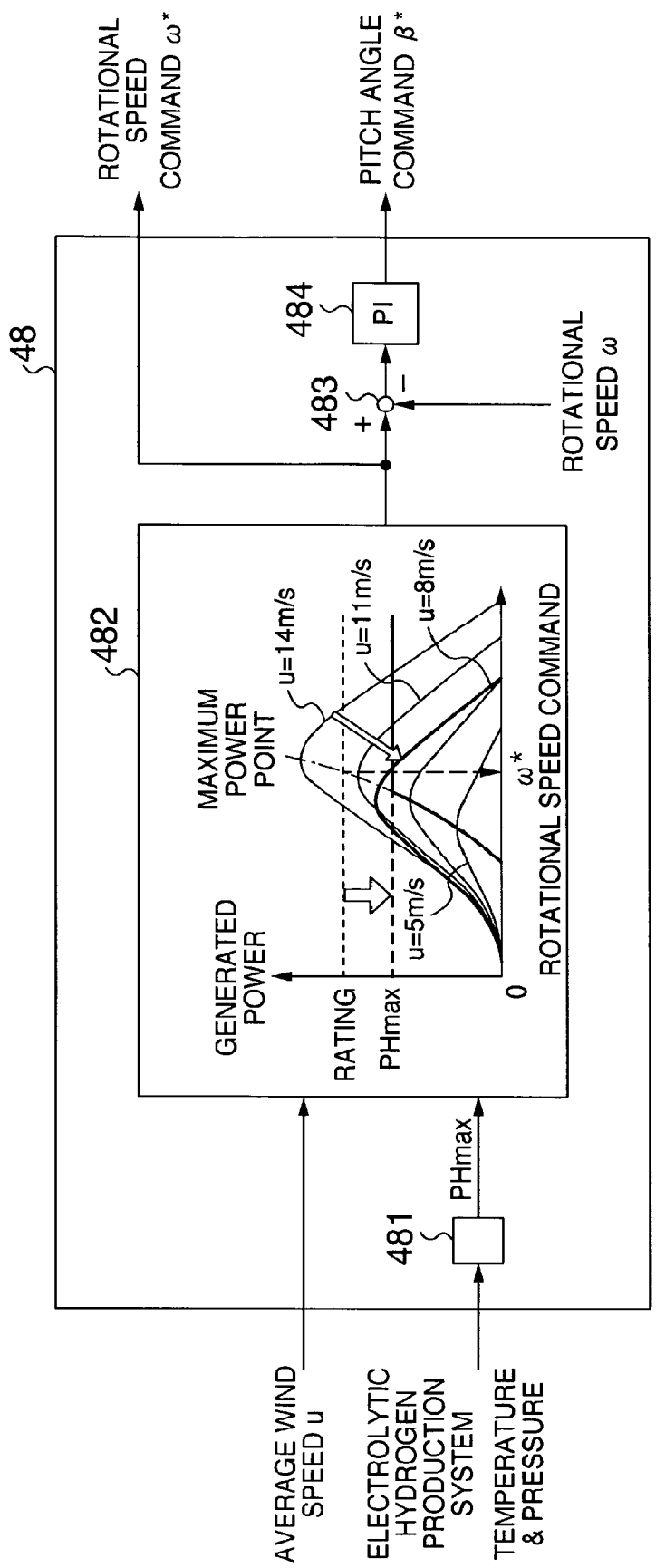
FIG. 10 is a block diagram illustrating the manner in which a pitch angle command is created in accordance with Embodiment 1.

In the present embodiment, when the pitch angle command β* for the wind turbine is created, the maximum value of the generated electric power is determined from the status of the electrolytic hydrogen production system 2. The method of control is described in detail by referring to FIG. 10. First, the maximum value PHmax of the electric power that can be consumed in the electrolytic hydrogen production system 2 is computed from the temperature and pressure of the production system 2 by a maximum electric power computing unit 481. For example, in the maximum power computing unit 481, the maximum value PHmax (=Ib×Vb) is found from the maximum current Ib and voltage Vb shown in FIG. 3. Then, the rotational speed command ω* is calculated from the average wind speed u and PHmax. A rotational speed command computing unit 482 sets the maximum value of the generated electric power to PHmax, and determines the rotational speed command value ω* from the intersection of the generated electric power and the characteristic curve of the rotational speed. A subtractor 483 subtracts the actual rotational speed ω from the obtained rotational speed command value ω*, thus creating the difference with the command value. The difference value is passed through the proportional-integral controller 484, creating the pitch angle command β*.

In this way, the rotational speed command computing unit 482 shifts the maximum value of the generated electric power from the maximum value of the generated electric power of the wind turbine 1 and sets the maximum value to PHmax. In consequence, the average output power from the wind turbine becomes equal to the maximum electric power that can be consumed by the electrolytic hydrogen production system 2.

As described so far, a current command for the electrolytic hydrogen production system 2 is created from the rotational speed of the wind generator 1. Fast varying components of the output from the wind turbine can be absorbed by varying the electric power used for production of hydrogen. Therefore, the rotational speed of the wind turbine 1 is suppressed within the operable range. Furthermore, slowly varying components are absorbed by pitch angle control. Because of these methods, the rotational speed of the wind turbine 1 is held within the operable range. Consequently, hydrogen is produced for a longer time. The amount of generated hydrogen is increased.

Embodiment 2

The present embodiment is described. The present embodiment pertains to self-starting of a hydrogen production system using a wind turbine. First, the prior-art method of starting the wind turbine connected with an electric power system is described. The main circuit portions of the wind turbine are connected with the electric power system via a converter and an inverter. The main circuit portions are circuits which are connected from the output terminal of the electricity generator to the system via a power converter system. A circuit breaker is present within the power converter system of the wind turbine. When the wind turbine is at stand-by state, the main circuit is electrically disconnected from the power system. On the other hand, the power supply for the controllers of the wind turbine is supplied from the power system using a step-down transformer. Therefore, if the generator is at rest, the control power supply is supplied and so the converter can be controlled. When the rotational speed of the generator reaches the operable range, the controller runs the converter and other components and starts to generate electricity.

Figure 11:
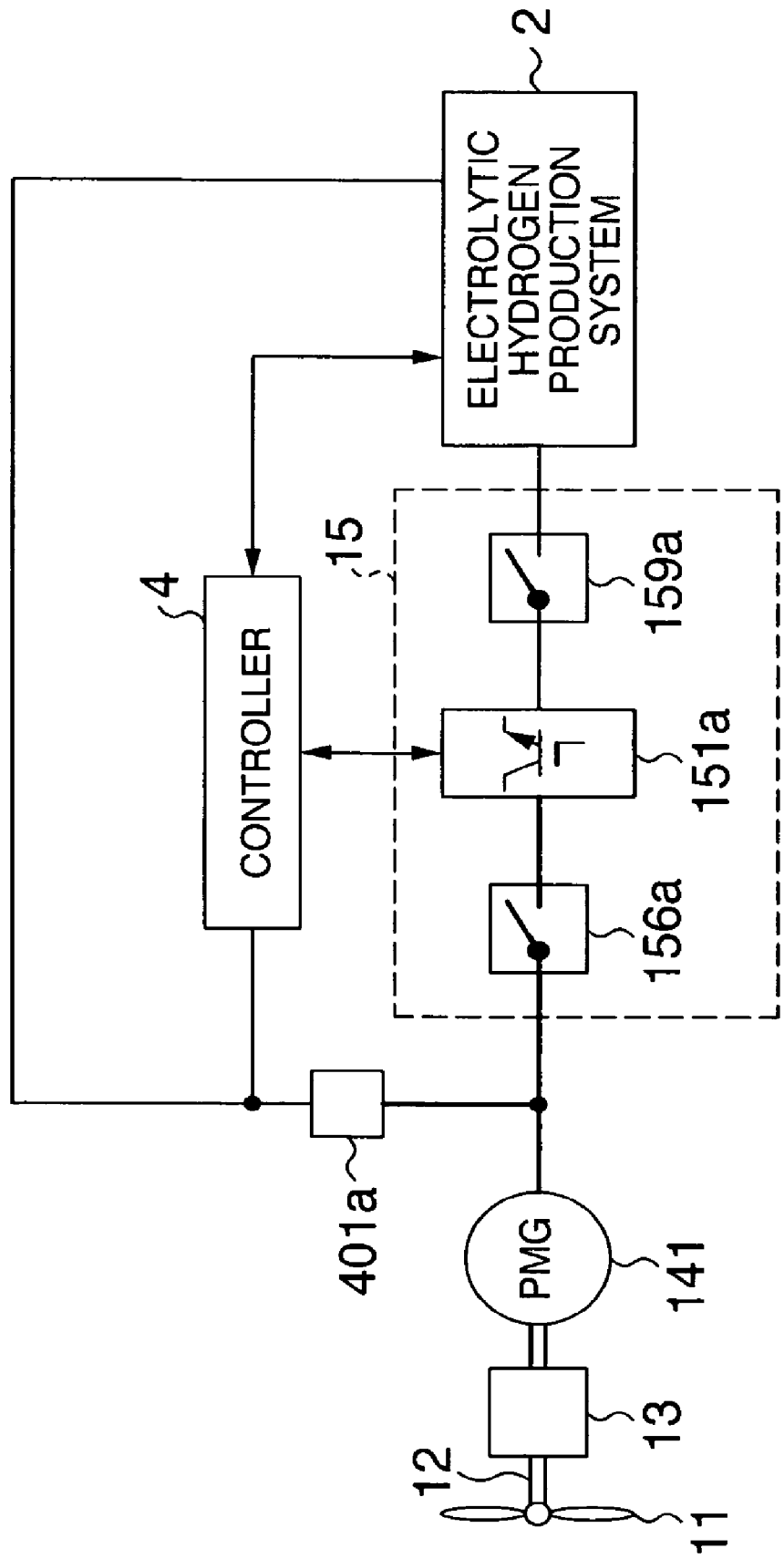
FIG. 11 is a diagram of a wind turbine-driven hydrogen production system equipped with a permanent-magnet generator connected with a system according to Embodiment 2.

The structure of a wind turbine-driven hydrogen production system installed independent of the electric power system of the present embodiment is next described by referring to FIG. 11. In this case, the power system 9 does not exist and so the power supply for the controller is supplied from a permanent-magnet generator 141. A method of self-starting is described in detail in the following. First, the pitch angle is kept constant, and the equipment waits until the blades 11 catch wind and the permanent-magnet generator 141 rotates. When the blades 11 catch wind, the permanent-magnet generator 141 starts to rotate at a low rotational speed. Since the permanent-magnet generator 141 uses a permanent-magnet generator that does not need exciter, a voltage is developed across the stator of the permanent-magnet generator 141 when rotation starts. This voltage is converted into an electric power supplied to the controller 4 using a power supply 401a. The power supply for the controllers is also supplied to the electrolytic hydrogen production system 2. Utilizing the power supply for the controllers, the controller 4 starts to perform calculations for control purposes. When the rotational speed of the permanent-magnet generator 141 reaches an operable rotational speed, breakers 156a and 157a are closed. Furthermore, the converter 151a is run to start production of hydrogen.

In the present embodiment, too, the current value command Idc* is created using a control method similar to the control method of Embodiment 1. Where this control method is used, the rotational speed of the wind turbine does not decrease below the lower limit of the rotational speed at low rotational speeds occurring immediately after the start-up. It is possible to stably shift to a state in which hydrogen is produced.

By adopting the structure described so far, the wind turbine-driven hydrogen production system independent of the power system 9 can be self-started.

Embodiment 3

The present embodiment pertains to self-starting of a hydrogen production system using a wind turbine. The difference of the present embodiment with Embodiment 1 is that the generator of the wind turbine needs an exciter.

First, the prior-art method of starting a wind turbine which needs an exciter and is connected with an electric power system is described. An example of a generator that needs an exciter is a doubly-fed induction generator. The stator of the doubly-fed induction generator is directly connected to the electric power system. An excitation current is supplied to the rotor from a converter. A power supply for the controller is supplied from the electrical power system via a step-down transformer. The controller waits using the power supply supplied from the power system until the wind turbine assumes an operable state. When the operable state is reached, the inverter and converter are operated. An excitation current is supplied to the stator side of the generator from the power system. Then, the turbine shifts to a state in which electricity is generated. The prior-art method of starting the generator has been described so far.

Figure 12:
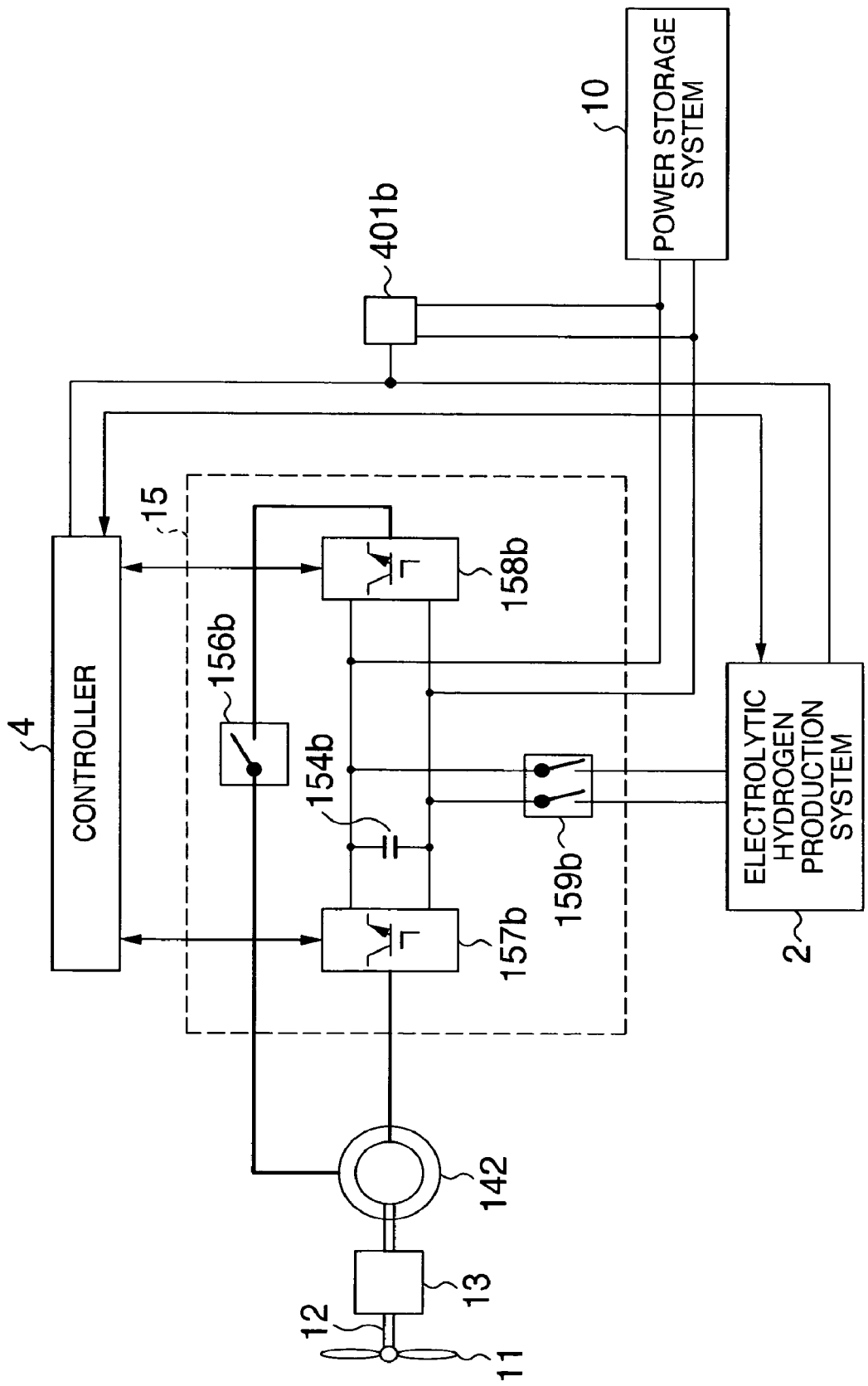
FIG. 12 is a diagram of a wind turbine-driven hydrogen production system equipped with a doubly-fed induction generator independent of a system according to Embodiment 3.

A method of starting a wind turbine-driven hydrogen production system in accordance with the present embodiment is described by referring to FIG. 12, the production system being installed independent of an electrical power system. FIG. 12 shows an example of structure using doubly-fed power generation. The greatest difference with a wind turbine connected with a system is that a power storage system 10 is used. When the wind turbine 1 stops the generation of electricity, power supplies for the controller 4 and for the hydrolytic hydrogen production system 2 are supplied by the power storage system 10. When the wind turbine 1 becomes operable, an excitation current is supplied from the power storage system 10 to the rotor side of the doubly-fed induction generator 142 via an inverter 157b. After shifting to the state in which the turbine is generating electricity, the breaker 156b is closed. The converter 158b is run. After the DC voltage reaches a value at which hydrogen can be produced, the breaker 159b is closed. Consequently, the generated electric power is supplied to the electrolytic hydrogen production system 2. The hydrogen production system shifts to a state in which it is producing hydrogen. At the same time, the power storage system 10 becomes charged with electrical power, and makes preparations for the next stand-by state.

In the present embodiment, too, the current value command supplied to the electrolytic hydrogen production system 2 is controlled by a method similar to the control method in Embodiment 1. If this control method is used, the rotational speed of the wind turbine does not become lower than the lower limit of the rotational speed at low rotational speeds occurring immediately after the start-up. It is possible to stably shift the system to the state in which hydrogen is produced.

Figure 13:
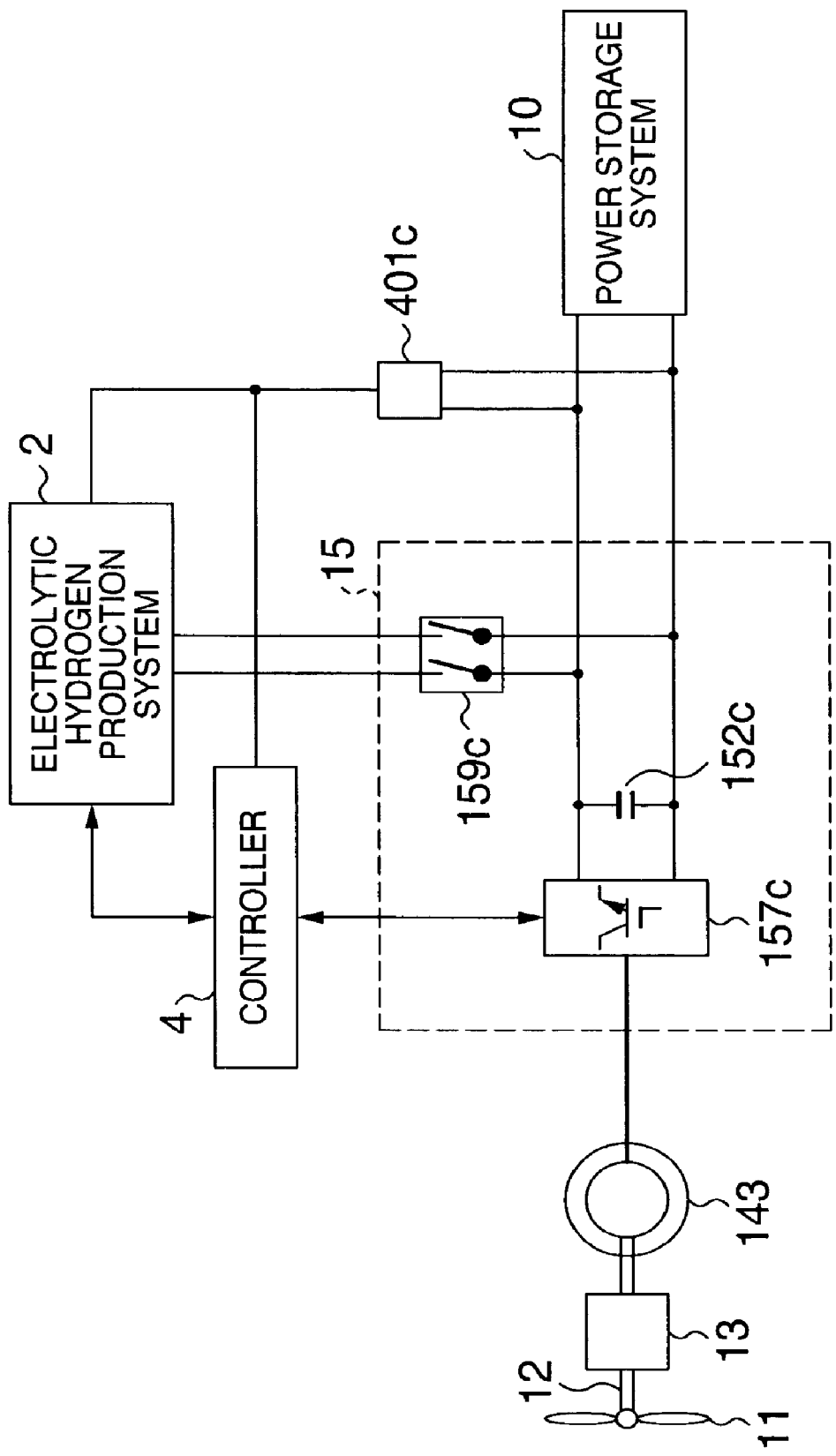
FIG. 13 is a diagram of a wind turbine-driven hydrogen production system equipped with a squirrel cage induction generator independent of a system according to Embodiment 3.

By adopting the structure described so far, the hydrogen production system independent of the power system 9 can be self-started. In the description provided thus far, the doubly-fed induction generator 142 is used as the generator. Self-starting is possible by employing a structure using a power storage system if the generator is a synchronous generator or a squirrel cage induction generator. The present embodiment using the squirrel cage induction generator 143 is shown, by way of example, in FIG. 13.

Embodiment 4

The present embodiment pertains to self-starting of a hydrogen production system using a wind turbine. The difference of the present Embodiment 3 with Embodiment 2 is that a power supply for the controllers is supplied from a power system.

Figure 14:
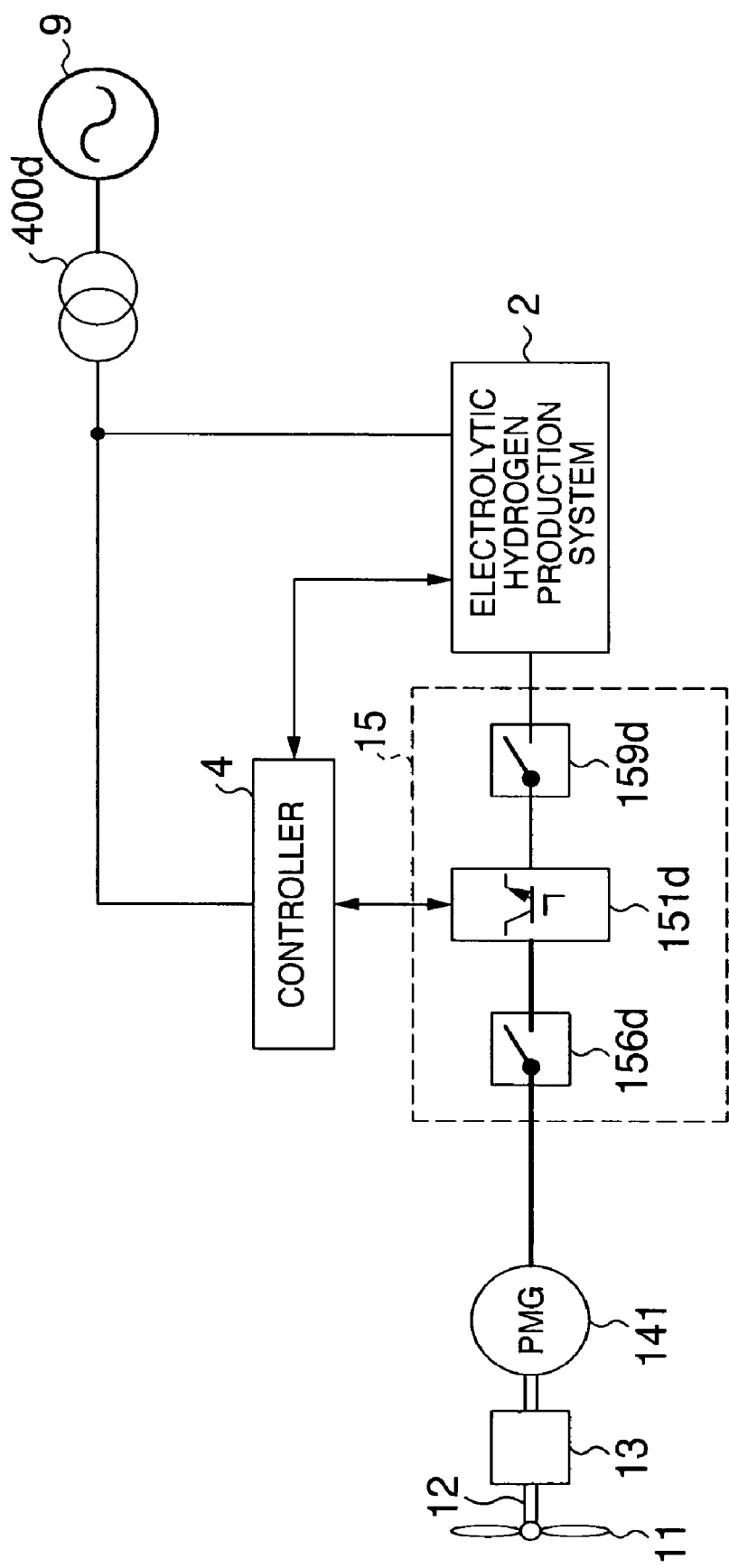
FIG. 14 is a diagram of a wind turbine-driven hydrogen production system according to Embodiment 4 of the invention, and in which a control power supply is supplied from a system.

The present embodiment is described by referring to FIG. 14. A permanent-magnet generator 141 is used as an electricity generator. Instead of the permanent-magnet generator 141, a doubly-fed induction generator, squirrel cage induction generator, or synchronous generator may be used. The output terminal of the permanent-magnet generator 141 is connected with the hydrolytic hydrogen production system 2 via the power converter system 15. In this way, the main circuit portions of the wind turbine 1 are independent of the power system. Meanwhile, a power supply for the controller 4 of the hydrogen production system and a power supply for the electrolytic hydrogen production system 2 are supplied from the power system 9 via the step-down transformer 400d.

A method of self-starting is described in detail in the following. First, the pitch angle is kept constant. The production system waits until the blades 11 catch wind and the permanent-magnet generator 141 rotates. The controller 4 waits until a power supply for the controllers from the power system 9 is received and the rotational speed reaches a value at which the turbine can be run. When the rotational speed of the permanent-magnet generator 141 reaches the rotational speed permitting the operation, the breakers 156d and 159d are closed. The converter 151d is run. Production of hydrogen is started.

In the present embodiment, too, the current value command Idc* is created using a control method similar to the control method of Embodiment 1. Where this control method is used, the rotational speed of the wind turbine does not decrease below the lower limit of the rotational speed at low rotational speeds occurring immediately after the start-up. It is possible to stably shift the production system to a state in which it produces hydrogen.

Figure 15:
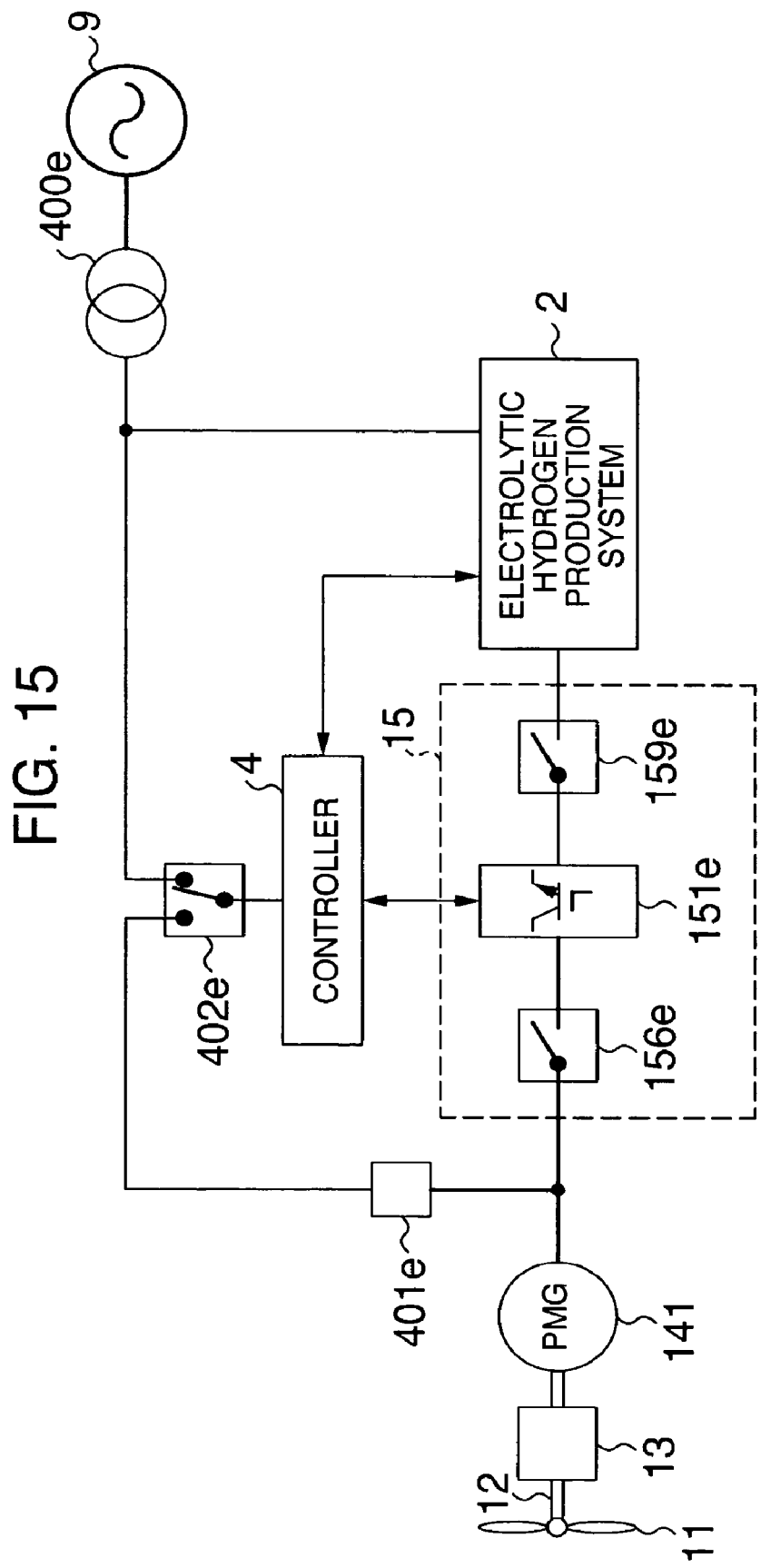
FIG. 15 is a diagram of another wind turbine-driven hydrogen production system according to Embodiment 4 of the invention, and in which a control power supply is supplied from a system.

In FIG. 14, the power supply is supplied always from the power system 9. Alternatively, the power supply may be supplied from the wind turbine 1 as shown in FIG. 15. At start-up of the hydrogen production system, the control power supply is received from the power system 9. After shifting to the state in which hydrogen is produced, the control power supply is supplied from the permanent-magnet generator 141 by switching a switch 402e.

By adopting the structure described so far, the hydrogen production system receiving only the power supply for the controllers from the power system 9 can be self-started. Electric power generated by the wind turbine 1 is not sent to the power system 9. Since only a small amount of electric power for the power supply is received, the capacity of the power transmission line can be made small.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind turbine-driven hydrogen production system having a wind turbine, installed independent of an electric power system and connected to an electrolytic hydrogen production system, to produce an output power to said electrolytic hydrogen production system for hydrogen production, said wind turbine-driven hydrogen production system comprising:

means for generating a current command value based on amounts of a pressure of hydrogen and a temperature within said electrolytic hydrogen production system, a rotational speed of said wind turbine of said wind turbine-driven hydrogen production system, and a pitch angle of said wind turbine used to control the rotational speed of said wind turbine of said wind turbine-driven hydrogen production system, the pitch angle of said wind turbine being arranged to be determined in accordance with an average wind speed of said wind turbine and a maximum electric power having been calculated based on the pressure and the temperature within said wind turbine-driven hydrogen production system; and means for varying an electrical current supplied to said electrolytic hydrogen production system in accordance with the current command value so as to suppress variations in the rotational speed of said wind turbine.

2. The wind turbine-driven hydrogen production system as claimed in claim 1, further comprising:

a permanent-magnet generator included in said wind turbine to enable said wind turbine-driven hydrogen production system to self-start independently from the electric power system; and means for supplying a power supply from said permanent-magnet generator to a controller of said wind turbine and a controller of said electrolytic hydrogen production system.

3. The wind turbine-driven hydrogen production system as claimed in claim 1, wherein:

said wind turbine includes one of an induction generator, a synchronous generator, and a doubly-fed induction generator arranged to enable said wind turbine-driven hydrogen production system to self-start independently from the electric power system; and said wind turbine-driven hydrogen production system further includes a power storage system and an exciter, and means for supplying a power supply from said power storage system at a start-up of said wind turbine to a controller of said wind turbine and a controller of said electrolytic hydrogen production system, and for supplying a power supply from said power storage system to the exciter at the start-up.

4. A wind turbine-driven hydrogen production system having a wind turbine, installed independent of an electric power system and connected to an electrolytic hydrogen production system, to produce an output power to said electrolytic hydrogen production system for hydrogen production, said wind turbine-driven hydrogen production system comprising:

means for varying an electrical current supplied to said electrolytic hydrogen production system to suppress variations in a rotational speed of said wind turbine; and means for determining a range of the electrical current supplied to said electrolytic hydrogen production system based on a pressure of hydrogen and a temperature within said hydrolytic hydrogen production system.

5. A wind turbine-driven hydrogen production system whose output power is supplied to an electrolytic hydrogen production system to produce hydrogen, said wind turbine-driven hydrogen production system comprising:

means for generating a current command value based on amounts of a pressure of hydrogen and a temperature within said electrolytic hydrogen production system, a rotational speed of said wind turbine of said wind turbine driven hydrogen production system, and a pitch angle of said wind turbine used to control the rotational speed of said wind turbine of said wind turbine-driven hydrogen production system, the pitch angle of said wind turbine being arranged to be determined in accordance with an average wind speed of said wind turbine and a maximum electric power having been calculated based on the temperature and the pressure within said wind turbine-driven hydrogen production system;

means for varying an electrical current supplied to said electrolytic hydrogen production system in accordance with the current command value so as to suppress variations in the rotational speed of said wind turbine; and means for supplying a power supply from an electric power system to a controller of said wind turbine or to a controller of said electrolytic hydrogen production system.

6. A wind turbine-driven hydrogen production system whose output power is supplied to an electrolytic hydrogen production system to produce hydrogen, said wind turbine-driven hydrogen production system comprising:

means for varying an electrical current supplied to said electrolytic hydrogen production system to suppress variations in a rotational speed of said wind turbine;

means for supplying a power supply from an electric power system to a controller of said wind turbine or a controller of said electrolytic hydrogen production system; and means for determining a range of the electrical current supplied to said electrolytic hydrogen production system based on a pressure of hydrogen and a temperature within said electrolytic hydrogen production system.

* * * * *